United States Patent
Lim et al.

(10) Patent No.: US 9,191,955 B2
(45) Date of Patent: Nov. 17, 2015

(54) METHOD FOR CHANNEL SEARCHING IN A MEDICAL BODY AREA NETWORK

(75) Inventors: Jaewon Lim, Anyang-si (KR); Suhwook Kim, Anyang-si (KR); Bonghoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 14/125,634

(22) PCT Filed: Jan. 20, 2012

(86) PCT No.: PCT/KR2012/000557
§ 371 (c)(1),
(2), (4) Date: Dec. 12, 2013

(87) PCT Pub. No.: WO2013/002469
PCT Pub. Date: Jan. 3, 2013

(65) Prior Publication Data
US 2014/0128000 A1     May 8, 2014

Related U.S. Application Data

(60) Provisional application No. 61/501,188, filed on Jun. 25, 2011.

(51) Int. Cl.
| | |
|---|---|
| H04B 7/00 | (2006.01) |
| H04W 72/04 | (2009.01) |
| H04W 48/16 | (2009.01) |
| H04W 4/00 | (2009.01) |
| H04B 1/68 | (2006.01) |

(52) U.S. Cl.
CPC .......... *H04W 72/0453* (2013.01); *H04W 4/008* (2013.01); *H04W 48/16* (2013.01); *H04W 72/042* (2013.01)

(58) Field of Classification Search
CPC ............ H04W 72/04; H04W 72/0406; H04W 72/0453
USPC .............................. 455/62, 453–454, 509, 516
See application file for complete search history.

(56) References Cited

U.S. PATENT DOCUMENTS

| | | | |
|---|---|---|---|
| 2008/0051099 A1* | 2/2008 | Moore et al. | ................... 455/454 |
| 2008/0285515 A1 | 11/2008 | Sim et al. | |

(Continued)

FOREIGN PATENT DOCUMENTS

| | | |
|---|---|---|
| KR | 10-2009-0076151 A | 7/2009 |
| KR | 10-2010-0005870 A | 1/2010 |

OTHER PUBLICATIONS

Written Opinion issued in corresponding International Patent Application No. PCT/KR2012/000557 dated Sep. 14, 2012.

(Continued)

*Primary Examiner* — Lee Nguyen
(74) *Attorney, Agent, or Firm* — Morgan, Lewis & Bockius LLP

(57) ABSTRACT

Provided is a method for channel searching for enabling a medical body area network (MBAN) terminal, which operates in an allocated frequency band, to use another frequency band. The method may comprise the steps of receiving an identifier of a specific channel group, from among a plurality of channel groups, from an MBAN coordinator in the allocated frequency band; and searching for a channel in a channel group relating to the received identifier of the channel group in a different frequency band. The identifier of the channel group indicates a channel group including channels that the terminal preferentially searches for in the other frequency band.

23 Claims, 13 Drawing Sheets

(56) References Cited

U.S. PATENT DOCUMENTS

2009/0280805 A1 11/2009 Kim et al.
2013/0329690 A1* 12/2013 Kim et al. ..................... 370/329

OTHER PUBLICATIONS

International Search Report issued in corresponding International Patent Application No. PCT/KR2012/000557 dated Sep. 14, 2012.

* cited by examiner (a)  (b)

FIG. 4

| Frame Control | Sequence Number | Addressing Fields | Auxiliary Security Header | SuperFrame Specification | GTS fields | Pending address fields | Beacon Payload | FCS |

FIG. 5
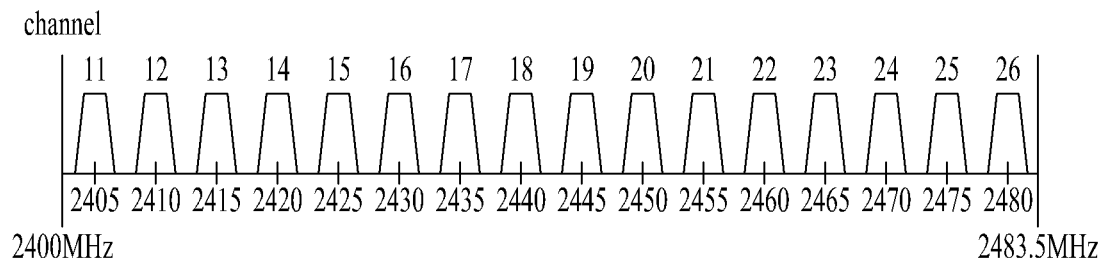
FIG. 6
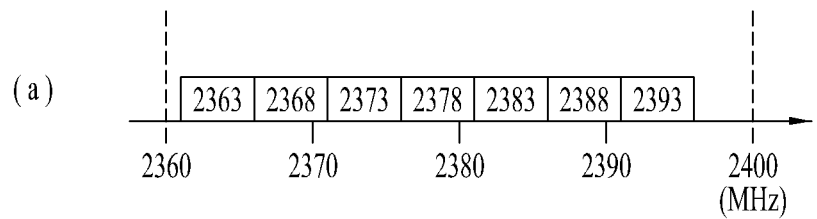
(a)
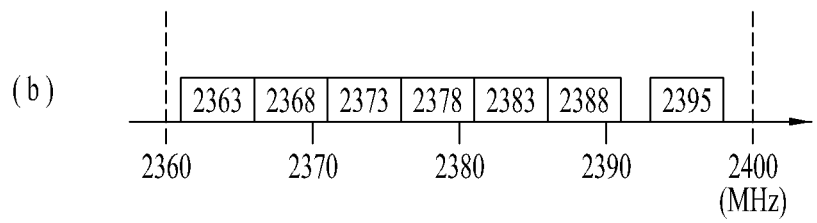
(b)

FIG. 7
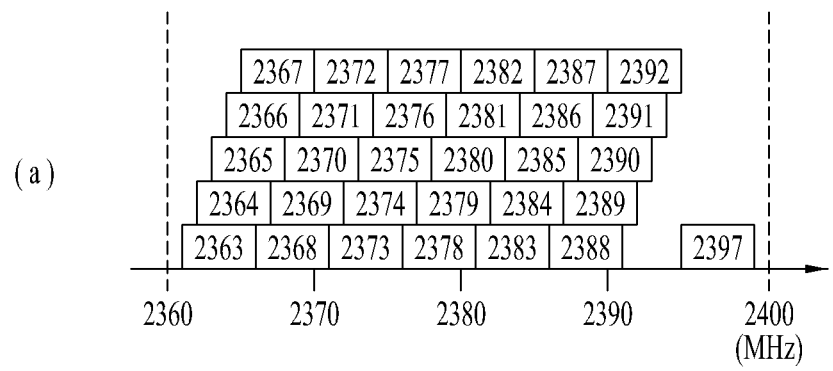
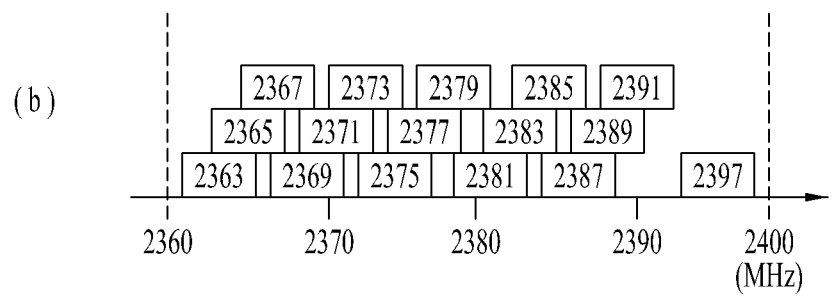
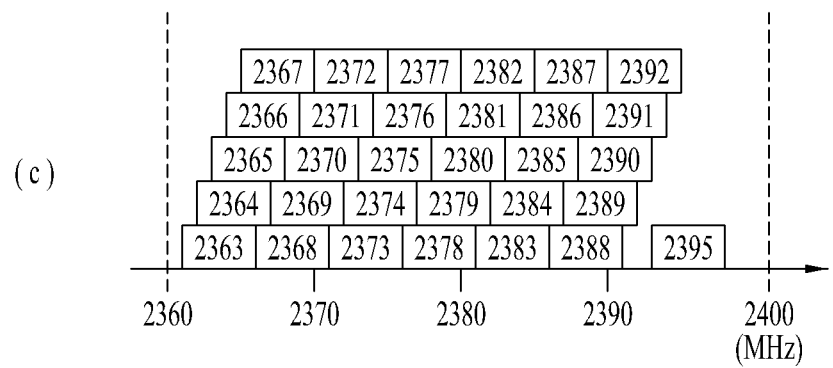

FIG. 8
(a) 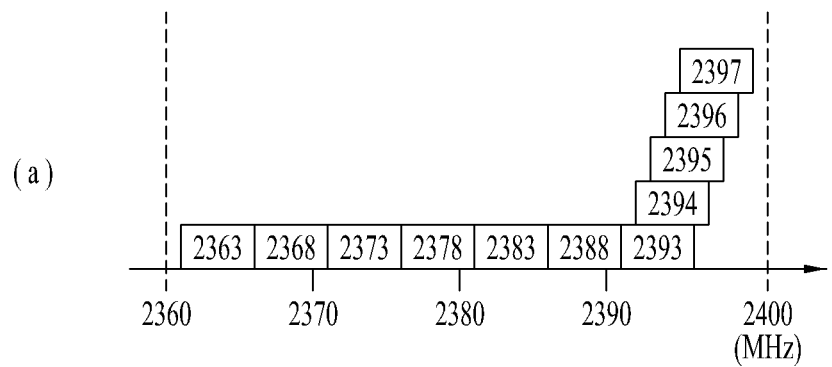
(a) 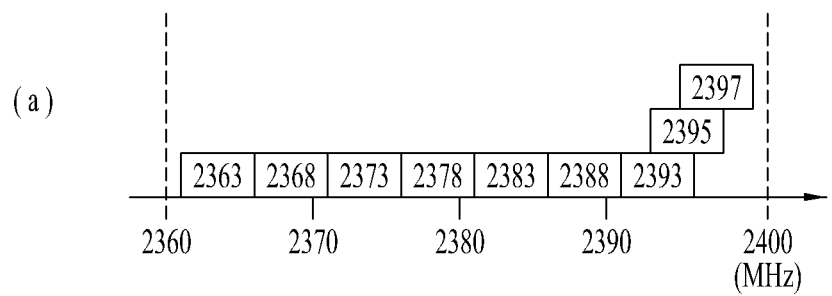

FIG. 9
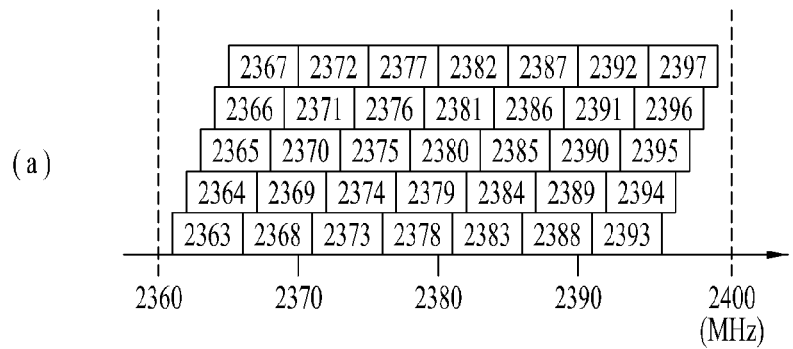
(a)
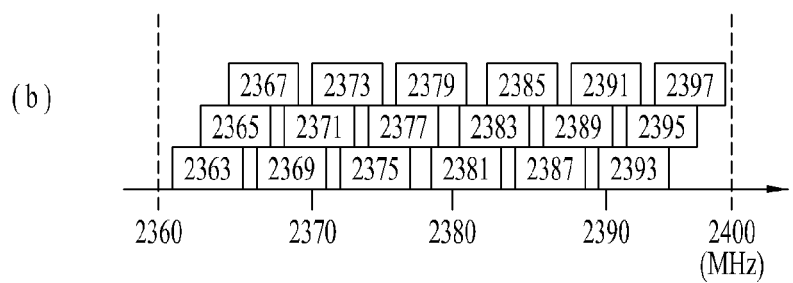
(b)
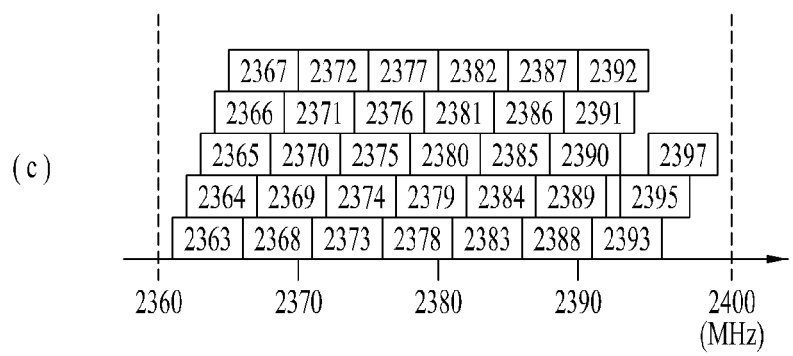
(c)
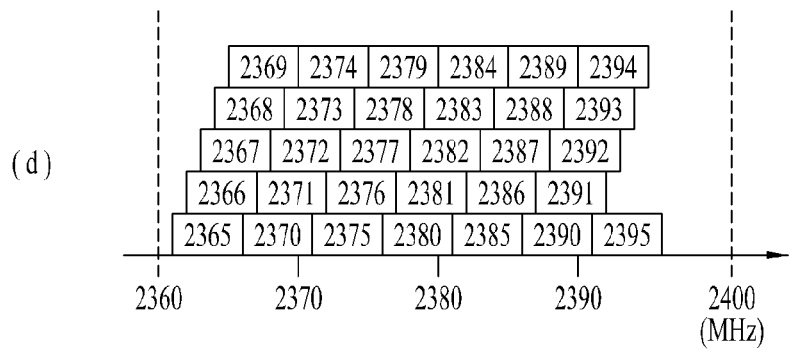
(d)

FIG. 11

| Frame Control | Sequence Number | Addressing Fields | Auxiliary Security Header | Command Frame identifier | Channel Group Indication) | FCS |

FIG. 12

| Frame Control | Sequence Number | Addressing Fields | Auxiliary Security Header | SuperFrame Specification | Channel Group Indication) | GTS fields | Pending address fields | Beacon Payload | FCS |

METHOD FOR CHANNEL SEARCHING IN A MEDICAL BODY AREA NETWORK

This is a U.S. National Phase Entry of PCT Application No. PCT/KR2011/000557 filed Jan. 20, 2012, and claims the benefit of U.S. Provisional Application No. 61/501,188 filed Jun. 25, 2011.

TECHNICAL FIELD

The present invention relates to a method and apparatus for searching for a channel in a medical body area network (MBAN), and more particularly to, a method and apparatus for enabling an MBAN user equipment operated at an allocated bandwidth to search for a channel for using another frequency bandwidth.

BACKGROUND ART

A medical body area network (MBAN) system has been devised to provide a flexible platform for wireless networking of a plurality of sensors used to monitor biological data of a patient in a health care facility such as a hospital.

The MBAN system is operated at bands of 2360 MHz to 2400 MHz on the basis of the IEEE 802.15.4, and its maximum emission bandwidth is limited to 5 MHz.

If the MBAN system is operated at 2360 MHz to 2390 MHz, its transmission power has the smaller value of 1 mW and $10*\log(B)$dBm. At this time, B is the emission bandwidth of 20 dB. If the MBAN system is operated at 2390 MHz to 2400 MHz, its transmission power has the smaller value of 20 mW and $10*\log(B)$dBm, wherein B is the emission bandwidth of 20 dB.

2360 MHz to 2400 MHz is the frequency bandwidth already allocated for another wireless communication system. The MBAN system is operated on the basis of the cognitive radio technology. The cognitive radio technology means that a network or wireless communication device actively senses and determines its neighboring communication environment to adaptively change transmission and reception properties, such as frequency bandwidth, transmission power and coding scheme, which are intended for optimized communication. In this case, if the cognitive radio device senses use of another licensed user (or primary user) at a desired frequency bandwidth, the cognitive radio device is preferentially operated so as not to disturb communication of the corresponding users.

To this end, the MBAN devices are basically operated inside a registered health care facility if they are operated at 2360 MHz to 2390 MHz. In other words, the MBAN devices should control use for 2360 MHz to 2390 MHz through cooperation with another licensed user, and if another licensed user uses the corresponding bandwidth, the MBAN devices should reset all the operations at this bandwidth and resume the operation by newly using the bandwidth of 2390 MHz to 2400 MHz.

If the MBAN devices move outdoor, they should stop their operations or change a transmission bandwidth to the bandwidth of 2390 MHz to 2400 MHz used as the basic bandwidth. If the MBAN devices are operated at the bandwidth of 2390 MHz to 2400 MHz, they may be used indoor and outdoor without limitation.

However, a detailed channel arrangement and a method for searching for a channel at each frequency bandwidth have not been defined for the MBAN system.

DISCLOSURE

Technical Problem

Accordingly, an object of the present specification is to provide channel arrangement for MBAN and a method for searching for a channel. Another object of the present specification is to provide an apparatus for performing the above method.

Technical Solution

To achieve the above objects, according to one disclosure of this specification, there is provided a method for enabling a medical body area network (MBAN) user equipment operated at an allocated frequency bandwidth to search for a channel for using another frequency bandwidth. The method comprises the steps of receiving an identifier of a specific channel group, among a plurality of channel groups, from an MBAN coordinator of the allocated frequency band, the identifier of the channel group indicating a channel group, which includes channels to be preferentially searched by the MBAN user equipment at another frequency bandwidth; and searching for a channel included in a channel group associated with the received identifier of the channel group at another frequency bandwidth.

The step of receiving the identifier of the channel group may include receiving the identifier of the channel group through a channel group indication command The step of receiving the identifier of the channel group may include receiving the identifier of the channel group through a channel group indication field included in a beacon transmitted from the MBAN coordinator of the allocated frequency bandwidth.

Each channel group of the plurality of channel groups is a set of channels which are continuously contiguous, and a central frequency of each channel belonging to one channel group may be different from central frequencies of all the channels belonging to another channel group.

Each channel group of the plurality of channel groups is a set of channels which are continuously contiguous, and at least one channel belonging to one channel group is overlapped with at least one channel belonging to another channel group within a predetermined frequency range, wherein central frequencies of the respective channels may be different from each other.

At this time, each channel group may be located within another frequency bandwidth.

Each channel group of the plurality of channel groups is a set of contiguous channels which are arranged with a predetermined guard band interposed therebetween, and a central frequency of each channel belonging to one channel group may be different from central frequencies of all the channels belonging to another channel group.

The method may further comprise the step of preferentially searching for a channel of another frequency bandwidth, which is arranged to be contiguous to a channel used at the allocated bandwidth after searching for the channel included in the channel group associated with the received identifier of the channel group.

In another aspect of the present invention, there is provided a method for channel searching for enabling a medical body area network (MBAN) user equipment, which operates at an allocated frequency bandwidth, to use another frequency bandwidth. The method may comprise the step of preferentially searching for a channel of another bandwidth, which is arranged to be continuously contiguous to a channel used at the allocated frequency bandwidth.

In still another aspect of the present invention, there is provided a medical body area network (MBAN) user equipment. The MBAN user equipment comprises a controller configured to receive an identifier of a specific channel group, among a plurality of channel groups, from an MBAN coordinator of the allocated frequency bandwidth, the identifier of the channel group indicating a channel group, which includes channels to be preferentially searched by the MBAN user equipment at another frequency bandwidth; and a wireless communication unit configured to search for a channel included in a channel group, which is associated with the received identifier of the channel group at another frequency bandwidth, under the control of the controller.

The controller may receive the identifier of the channel group through a channel group indication command The controller may receive the identifier of the channel group through a channel group indication field included in a beacon transmitted from the MBAN coordinator of the allocated frequency bandwidth.

The controller may control the wireless communication unit to preferentially search for the channel of another frequency bandwidth, which is arranged to be contiguous to the channel used at the allocated bandwidth.

In further still another aspect of the present invention, there is provided a medical body area network (MBAN) coordinator. The MBAN coordinator comprises a controller configured to generate an identifier of a specific channel group, among a plurality of channel groups, the identifier of the channel group indicating a channel group, which includes channels to be preferentially searched by an MBAN user equipment at another frequency bandwidth; and a wireless communication unit configured to transmit the received identifier of the channel group to the MBAN user equipment under the control of the controller.

The controller may control the wireless communication unit to transmit the identifier of the channel group through a channel group indication command The controller may control the wireless communication unit to transmit the identifier of the channel group through a channel group indication field included in a beacon.

Each channel group of the plurality of channel groups is a set of channels which are continuously contiguous, and a central frequency of each channel belonging to one channel group may be different from central frequencies of all the channels belonging to another channel group.

Each channel group may be located within another frequency bandwidth.

Each channel group of the plurality of channel groups is a set of contiguous channels which are arranged with a predetermined guard band interposed therebetween, and a central frequency of each channel belonging to one channel group may be different from central frequencies of all the channels belonging to another channel group.

Advantageous Effects

According to the embodiment of the present invention, the user equipment operated in the MBAN system may efficiently search for a channel at each frequency bandwidth. Also, the user equipment and the MBAN coordinator may perform communication more stably.

BRIEF DESCRIPTION OF THE DRAWINGS

FIG. 4 is a diagram illustrating a structure of a beacon frame used in the IEEE 802.15.4 system;

FIG. 5 is a diagram illustrating channel arrangement of the IEEE 802.15.4 system;

FIG. 6 is a diagram illustrating a first example of channel arrangement in a medical body area network;

FIG. 7 is a diagram illustrating a second example of channel arrangement in a medical body area network;

FIG. 8 is a diagram illustrating a third example of channel arrangement in a medical body area network;

FIG. 9 is a diagram illustrating a fourth example of channel arrangement in a medical body area network;

FIG. 11 is a diagram illustrating a structure of a channel group indication command frame according to the embodiment of the present invention;

FIG. 12 is a diagram illustrating a structure of a beacon frame according to the embodiment of the present invention;

BEST MODE FOR CARRYING OUT THE INVENTION

The technical terms used in this specification are used to describe a specific embodiment and are not intended to limit the present invention. Also, the technical terms used in this specification mean the same thing as that is generally understood by the person with ordinary skill in the art to which the present invention pertains, unless defined otherwise, and should not be defined as being excessively comprehensive or excessively restrictive. Also, when the technical terms used in this specification fail to exactly express the spirits of the present invention, it is to be understood that the terms should be replaced with those that may be understood correctly by the person with ordinary skill in the art. Also, it is to be understood that the terms defined in a dictionary which is generally used mean the same thing as that on the context of the related art, and should not be defined as being ideal or excessively formal, unless defined obviously in this specification.

The singular expression used in this specification includes the plural expression unless meant differently on the context. In this application, it is not to be understood that the terms such as "include" and "has" are intended to designate that elements or steps disclosed in the specification should be included essentially. It is to be understood that the terms such as "include" and "has" are intended to designate that some of the elements or some of the steps may not be included, or additional elements or steps may be included.

Also, the suffixes "module" and "unit" for the elements used in this specification are given or used in common by considering facilitation in writing this disclosure only but fail to have meanings or roles discriminated from each other.

Also, although the terms indicating the ordinal number such as first and second may be used to describe various elements, the elements should not be restricted by the terms. The terms are used to identify one element from another element. For example, the first element may be referred to as the second element and vice versa within the scope of the present invention.

Hereinafter, reference will now be made in detail to the preferred embodiments of the present invention, examples of which are illustrated in the accompanying drawings. Wherever possible, the same reference numbers will be used throughout the drawings to refer to the same or like parts.

Also, in the description of the present invention, the detailed description of the related art known in the art, which may make the subject matter of the present invention obscure, will be omitted. Also, it is to be understood that the accompanying drawings are intended to easily understand technical spirits of the present invention and the spirits of the present invention are not limited by the accompanying drawings.

Figure 1:
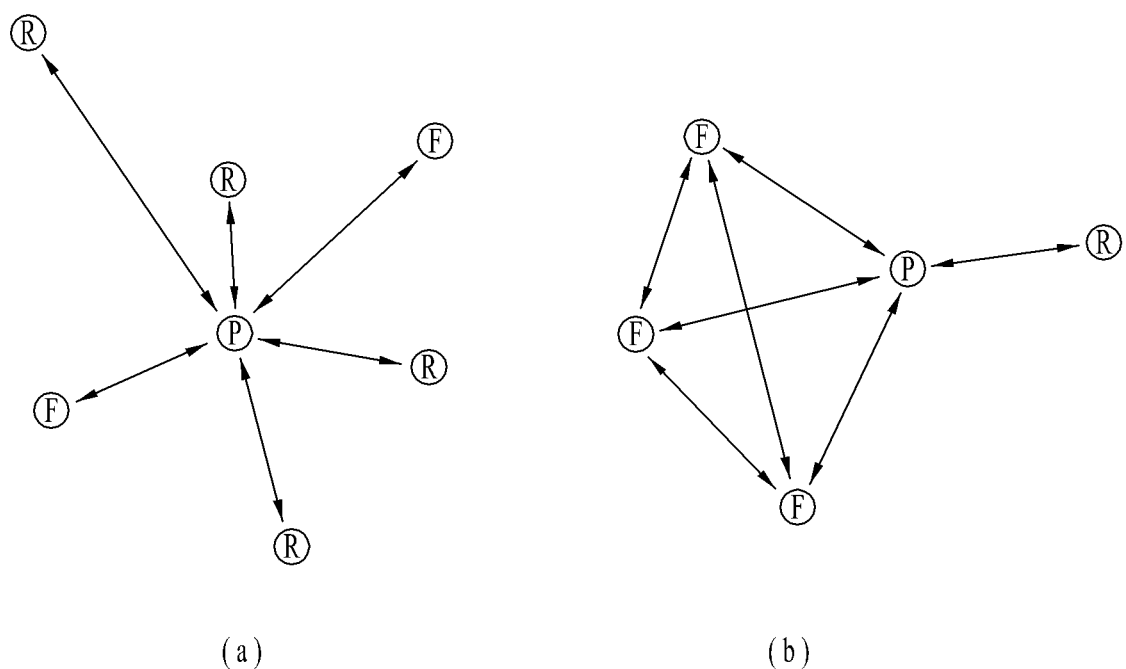
FIG. 1 is an exemplary diagram illustrating a network topology based on the IEEE 802.15.4.

FIG. 1 is an exemplary diagram illustrating a network topology based on the IEEE 802.15.4.

Two types of devices, a full function device (FFD) and a reduced function device (RFD) may join in the IEEE 802.15.4 network. The FED serves to perform network reset, node control, node information storage, etc. The FED that may enable the other devices to configure one network will be referred to as "a personal area network (PAN) coordinator".

The FFD is the device that may perform a coordinator function, and may configure various types of network topologies and perform communication with another FFD and RFD. In order to perform the coordinator function, since the PAN coordinator consumes relatively more power, the power is generally supplied to the PAN coordinator through a cable.

On the other hand, the RFD is the device that does not perform the coordinator function, and is a target for coordinating of the FFD. In other words, the RFD performs communication with the FFD only, and may use a minimum sized stack structure and save resources for operation/memory by allowing the FFD to perform a network function. Accordingly, after transmitting data by searching for the PAN coordinator, since the RFD may immediately disconnect access and enter a save (idle; sleep) mode, its power consumption is very low and the RFD may be operated even by a battery power for a long time.

In FIG. 1, the device marked with "F" means the FFD, the device marked with "R" means the RFD, and the device marked with "P" means the PAN coordinator.

FIG. 1 illustrates two types of network topologies that may be formed by the IEEE 802.15.4 system. (a) of FIG. 1 illustrates a start type network, and (b) of FIG. 1 illustrates a peer to peer type network.

In the start type topology, communication between the device and the PAN coordinator is only performed. At this time, the devices are start points or end points of communication, whereas the PAN coordinator may be a start point, end point or router.

In the peer to peer type topology, each device may perform communication with any other device within the network. Accordingly, more complex type network such as a mesh network may be configured.

The start type network may mange the devices so that a battery life of the devices may be maintained for a long time. Since the peer to peer type network may configure one or more data transfer paths, high data reliability and access recognition ratio may be obtained.

Figure 2:
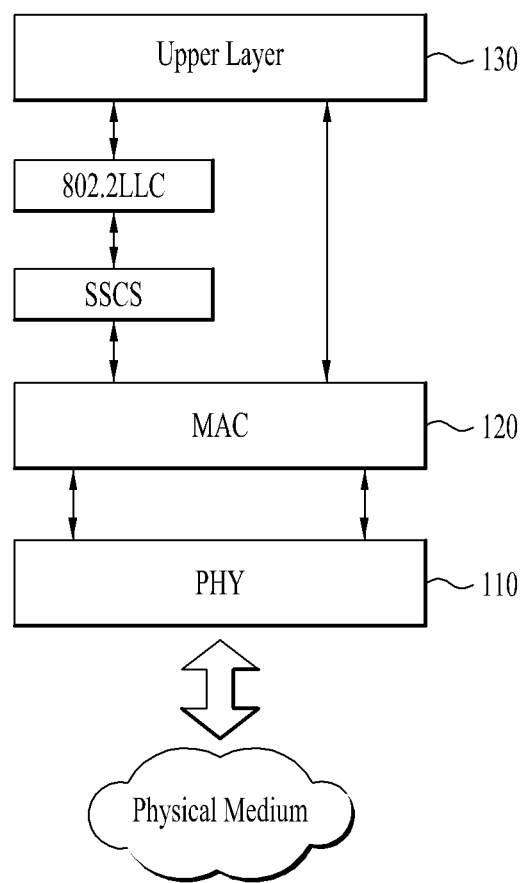
FIG. 2 is a structural diagram illustrating a protocol stack in the IEEE 802.15.4 system.

FIG. 2 is a structural diagram illustrating a protocol stack in the IEEE 802.15.4 system.

As will be aware of it with reference to FIG. 2, the IEEE 802.15.4 protocol stack includes a physical (PHY) layer 110, a medium access control (MAC) layer 120, and an upper layer 130.

The PHY layer 110 includes a radio frequency (RF) transceiver and a related control mechanism, and the MAC layer 120 provides an access to the physical channel for data transmission.

The upper layer 130 includes a network layer and an application layer. The network layer provides functions of configuration, processing and message routing of the network. The application layer provides a function targeted by the device. For example, the IEEE 802.15.4 device 100 may serve as a reduced function device (RFD), a full function device (FFD), or a coordinator in accordance with a type of a program, that is, a type of a program that processes data of the application layer.

Figure 3:
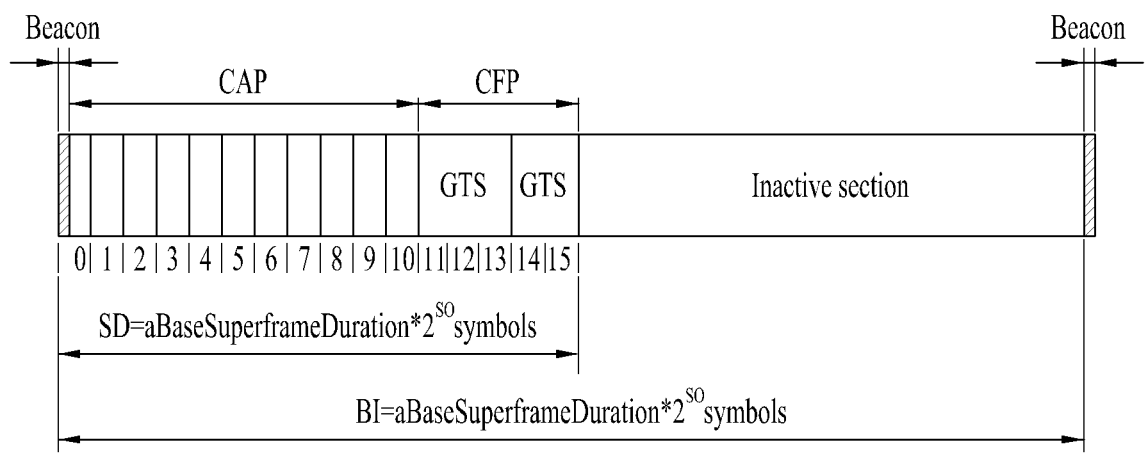
FIG. 3 is a diagram illustrating a structure of a super frame used in the IEEE 802.15.4 system.

FIG. 3 is a diagram illustrating a structure of a super frame used in the IEEE 802.15.4 system.

The IEEE 802.15.4 system includes an active period and an inactive period in accordance with low power requirements.

The active period includes a beacon, a contention access period (CAP), and a contention free period (CFP), wherein data transmission mainly occurs at the CAP.

The CFP includes guaranteed time slots (GTS), each of which may be allocated to be used for data transmission and reception between each device and the PAN coordinator. Maximum seven GTS may be supported by one PAN.

Allocation for each GTS is set by the PAN coordinator in the form of GTS descriptor. The GTS descriptors are included in a GTS field of the beacon and transmitted by the PAN coordinator.

FIG. 4 is a diagram illustrating a structure of a beacon frame used in the IEEE 802.15.4 system.

Each field of the beacon frame follows the description defined in the IEEE 802.15.4.

Particularly, allocation for each GTS is set by the PAN coordinator in the form of GTS descriptor. The GTS descriptors are included in a GTS field of the beacon and transmitted by the PAN coordinator.

FIG. 5 is a diagram illustrating channel arrangement of the IEEE 802.15.4 system.

As will be aware of it with reference to FIG. 5, the IEEE 802.15.4 system operated at a bandwidth of 2400 MHz has channel spacing of 5 MHz.

The MBAN system based on the IEEE 802.15.4 system uses a bandwidth of 2360 MHz to 2390 MHz and a bandwidth of 2390 MHz to 2400 MHz. The bandwidth of 2360 MHz to 2390 MHz may be used when the MBAN user equipment is allocated with a channel from the MBAN coordinator and operated inside a health care facility. (Hereinafter, "MBAN PAN coordinator", "PAN coordinator" and "MBAN coordinator" will be used to mean the same meaning.) The bandwidth of 2390 MHz to 2400 MHz may be used when the MBAN user equipment cannot receive information on the MBAN channel from the MBAN coordinator any more or when the MBAN user equipment or coordinator is operated outside the health care facility. Also, the bandwidth of 2390 MHz to 2400 MHz may be used as a basic channel bandwidth of the MBAN system.

FIG. 6 is a diagram illustrating a first example of channel arrangement in a medical body area network.

The MBAN system includes two methods for channel arrangement. The first method is that several channels are arranged to be overlapped with one another while the second method is that several channels are arranged to be non-overlapped with one another. In the MBAN system, since the channels may be arranged to be overlapped or non-overlapped with each other at the bandwidth of 2360 MHz to 2390 MHz and the bandwidth of 2390 MHz to 2400 MHz, four types of methods for channel arrangement exist.

The bandwidth of each channel is 5 MHz, and the bandwidth of 2360 MHz to 2360.5 MHz and the bandwidth of 2399.5 MHz to 2400 MHz are used as guard bands by the restrictions of federal communication commission (FCC). Hereinafter, a number of a channel means a central frequency.

(a) of FIG. 6 illustrates an example of channels arranged to be non-overlapped with one another at the bandwidth of 2360 MHz to 2390 MHz and the bandwidth of 2390 MHz to 2400 MHz. In the above example, seven channels exist in the MBNA system, and six channels are allocated to the bandwidth of 2360 MHz to 2390 MHz and one channel is allocated to the bandwidth of 2390 MHz to 2400 MHz. The location of each channel may be changed as shown in (b) of FIG. 6.

FIG. 7 is a diagram illustrating a second example of channel arrangement in a medical body area network.

(a) of FIG. 7 illustrates an example of channels arranged to be overlapped with one another at the bandwidth of 2360 MHz to 2390 MHz and channels arranged to be non-overlapped with one another at the bandwidth of 2390 MHz to 2400 MHz. In the above example, 30 channels are arranged at the bandwidth of 2360 MHz to 2390 MHz at an interval of 1 MHz, and one channel is arranged at the bandwidth of 2390 MHz to 2400 MHz.

At this time, channel spacing at the bandwidth of 2360 MHz to 2390 MHz may be changed as shown in (b) of FIG. 7. In this case, a total number of channels are changed. Also, the location of each channel may be changed as shown in (c) of FIG. 7.

FIG. 8 is a diagram illustrating a third example of channel arrangement in a medical body area network.

(a) of FIG. 8 illustrates an example of channels arranged to be non-overlapped with one another at the bandwidth of 2360 MHz to 2390 MHz and channels arranged to be overlapped with one another at the bandwidth of 2390 MHz to 2400 MHz. In the above example, six channels are arranged at the bandwidth of 2360 MHz to 2390 MHz at an interval of 1 MHz, and five channels are arranged at the bandwidth of 2390 MHz to 2400 MHz at an interval of 1 MHz. At this time, channel spacing at the bandwidth of 2390 MHz to 2400 MHz may be changed as shown in (b) of FIG. 8. In this case, a total number of channels are changed. Also, the location of each channel may be changed at the bandwidth of 2360 MHz to 2390 MHz as shown in (c) of FIG. 8.

FIG. 9 is a diagram illustrating a fourth example of channel arrangement in a medical body area network.

(a) of FIG. 9 illustrates an example of channels arranged to be overlapped with one another at both the bandwidth of 2360 MHz to 2390 MHz and the bandwidth of 2390 MHz to 2400 MHz. In this example, 30 channels are arranged at the bandwidth of 2360 MHz to 2390 MHz at an interval of 1 MHz, and five channels are arranged at the bandwidth of 2390 MHz to 2400 MHz at an interval of 1 MHz. At this time, channel spacing at the entire bandwidth may be changed as shown in (b) of FIG. 9. In this case, a total number of channels are changed. Also, channel spacing at the bandwidth of 2360 MHz to 2390 MHz may be different from that at the bandwidth of 2390 MHz to 2400 MHz as shown in (c) of FIG. 9.

(d) of FIG. 9 illustrates a channel arrangement when guard bands of both sides of the MBAN band are greater than those of any other portions. Although 30 channels are arranged at the bandwidth of 2360 MHz to 2390 MHz at an interval of 1 MHz in (d) of FIG. 9 in the same manner as (a), (b) and (c) of FIG. 9, one channel is allocated to the bandwidth of 2390 MHz to 2400 MHz.

Figure 10:
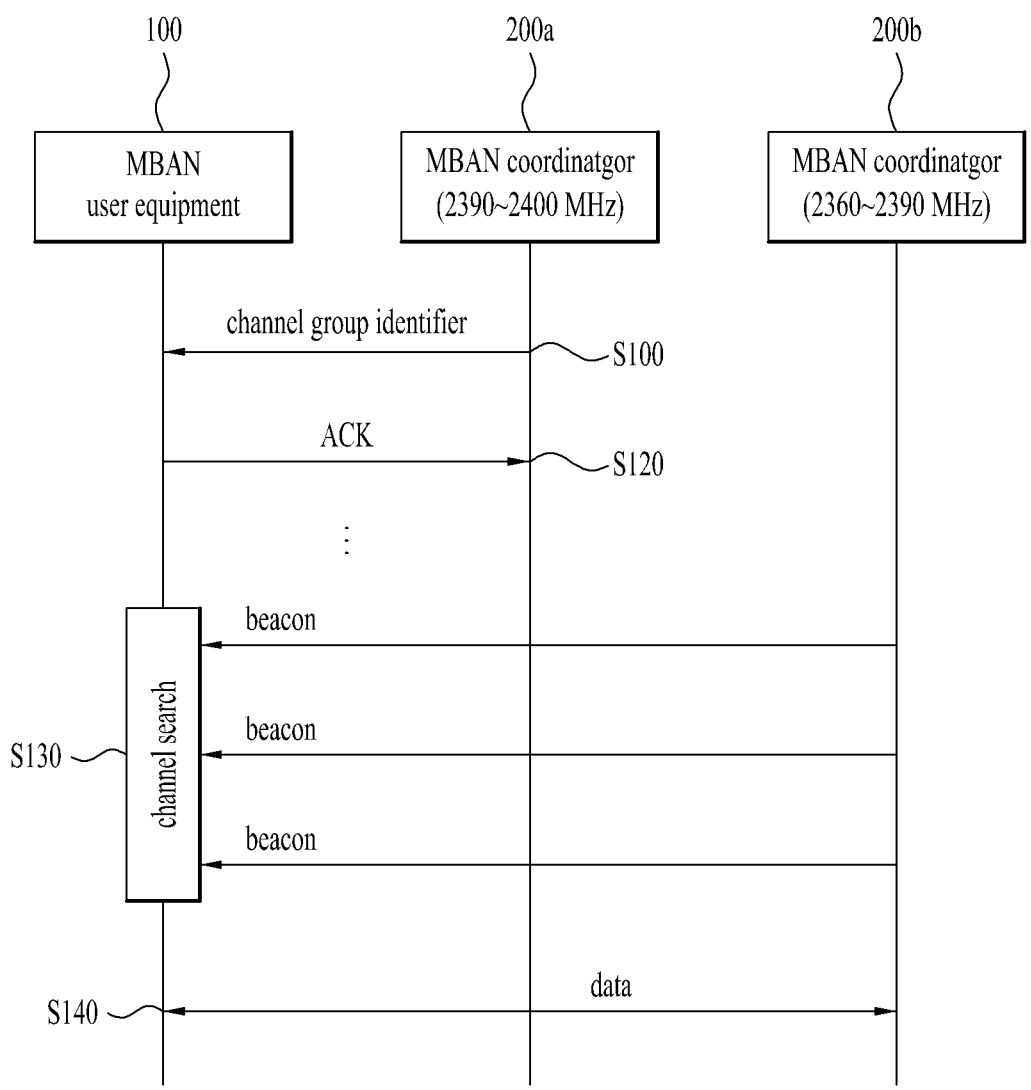
FIG. 10 is a flow chart illustrating a method for searching for a channel in accordance with the first embodiment of the present invention.

FIG. 10 is a flow chart illustrating a method for searching for a channel in accordance with the first embodiment of the present invention.

For convenience of description, it is assumed that the MBAN user equipment is operated at a channel of the bandwidth of 2390 MHz to 2400 MHz and then moves to the bandwidth of 2360 MHz to 2390 MHz. At this time, as shown in MBN channel arrangement of FIG. 6 to FIG. 9, since many channels exist at the bandwidth of 2360 MHz to 2390 MHz and a beacon period of the MBAN coordinator is long to reach maximum several hundreds of seconds, the MBAN user equipment may need much time to search for its available channels.

Accordingly, the present specification suggests the following method. First of all, MBAN channels at the bandwidth of 2360 MHz to 2390 MHz are divided into several groups. First of all, the MBAN coordinator notifies the MBAN user equipment of a channel group for which will first be searched when channels of different frequency bandwidths are used. The MBAN user equipment may reduce the time for channel search by first searching for the channels belonging to the channel group when moving to the channel of the bandwidth of 2360 MHz to 2390 MHz.

The first embodiment of the above method will be described with reference to FIG. 10.

The MBAN user equipment 100 may receive a specific channel group identifier of a plurality of channel groups of a frequency bandwidth, which is different from another frequency bandwidth (for example, 2390 MHz to 2400 MHz) to which a channel currently in service belongs, from the MBAN coordinator 200a of the frequency bandwidth to which the channel currently in service belongs (S100). At this time, the specific channel group identifier is the identifier indicating the channel group that includes the channels to be first searched by the MBAN user equipment 100 at the bandwidth (for example, 2360 MHz to 2390 MHz).

Each channel group of the plurality of channel groups is a set of channels that are continuously contiguous, and a central frequency of each channel belonging to one channel group may be different from central frequencies of all the channels belonging to another channel group. Also, each channel group may be located within the frequency bandwidth of 2360 MHz to 2390 MHz.

Also, each channel group of the plurality of channel groups is a set of channels that are continuously contiguous, and at least one channel belonging to one channel group is overlapped with at least one channel belonging to another channel group within a predetermined frequency range, wherein central frequencies of the respective channels may be different from each other. Also, each channel group may be located within the frequency bandwidth of 2360 MHz to 2390 MHz.

Also, each channel group of the plurality of channel groups is a set of contiguous channels which are arranged with a predetermined guard band interposed therebetween, and a central frequency of each channel belonging to one channel group may be different from central frequencies of all the channels belonging to another channel group. Also, each channel group may be located within the frequency bandwidth of 2360 MHz to 2390 MHz.

Also, each channel group of the plurality of channel groups includes two or more sets of channels which are contiguous or two or more sets of contiguous channels which are arranged with a predetermined guard band interposed therebetween, and a central frequency of each channel belonging to one channel group may be different from central frequencies of all the channels belonging to another channel group.

Also, each channel group of the plurality of channel groups may be configured in such a manner that random ones of MBAN channels available at the frequency bandwidth of 2360 MHz to 2390 MHz may be selected. At this time, the random channels of the corresponding channel group may previously be transferred to the MBAN user equipment. As a result, when the corresponding channel group identifier is transferred to the MBAN user equipment, the MBAN user equipment may identify the channels belonging to the corresponding channel group.

One example of a method for grouping the channels of the frequency bandwidth of 2360 MHz to 2390 MHz is that the channels arranged to be contiguous in FIG. 6 to FIG. 9 are defined as one group. For example, in case of (a) of FIG. 7, the channels 2367, 2372, 2377, 2382, and 2387 located on one line are set to group 1, and the channels 2366, 2371, 2376, 2381 and 2386 are set to group 2. Since five lines are provided in (a) of FIG. 7, the channels may be grouped from group 1 to group 5.

Another example of a method for grouping the channels of the frequency bandwidth of 2360 MHz to 2390 MHz is that the contiguous channels arranged with a guard band interposed therebetween as shown in (b) of FIG. 7 to (b) of FIG. 9 are defined as one group. For example, in case of (b) of FIG. 7, the contiguous channels 2363, 2369, 2375, 2381, and 2387 located with a guard band of 1 Mz interposed therebetween may be set to one group.

As still another example, as described above, one channel group may be set to include two or more sets of channels which are contiguous or two or more sets of contiguous channels which are arranged with a predetermined guard band interposed therebetween. For example, the first set (2367, 2372, 2377, 2382, 2392) and the second set (2363, 2368, 2373, 2379, 2378, 2383, 2388) of the contiguous channels in FIG. 9(*a*) may be determined as one channel group. For another example, the first set (2367, 2373, 2379, 2385, 2391) and the second set (2363, 2369, 2375, 2381, 2387) of the contiguous channels arranged with a predetermined guard band interposed therebetween in FIG. 9(*b*) may be determined as one channel group.

Alternatively, even though the channels are not located to be contiguous at the frequency bandwidth of 2360 MHz to 2390 MHz, specific channels may be selected to set the channel group. In this case, since the channels included in the corresponding channel group cannot be identified by the channel group identifier (channel group indication) only, the MBAN coordinator should previously transmit the channels included in the channel group to the MBAN user equipment before transmitting the channel group identifier.

After the aforementioned channel grouping, the MBAN coordinators should identify the information on the channel group and the channel group used at the frequency bandwidth of 2360 MHz to 2390 MHz. In this specification, it is assumed that the MBAN coordinators share the information on the channel group. It is also assumed that the MBAN user equipment knows what channels belong to the corresponding channel group.

If the MBAN user equipment 100 receives the channel group identifier successfully, the MBAN user equipment 100 may transmit ACK to the MBAN coordinator 200*a* (S120). Also, the MBAN user equipment 100 may store the received channel group identifier.

If the MBAN user equipment 100 moves to the frequency bandwidth of 2360 MHz to 2390 MHz, the MBAN user equipment 100 may first search for the channel belonging to the channel group associated with the received channel group identifier (S130).

For example, in (a) of FIG. 9, the MBAN user equipment 100 which is using the channel 2393 of the bandwidth of 2390 MHz to 2400 MHz may receive the channel group identifier from the MBAN coordinator 200*a*. The channel group identifier may be the identifier indicating channel group that includes the channels 2363, 2368, 2373, 2378, 2383 and 2388 of the bandwidth of 2360 MHz to 2390 MHz.

If the MBAN user equipment 100 moves to the frequency bandwidth of 2360 MHz to 2390 MHz, the MBAN user equipment 100 first searches for the channels 2363, 2368, 2373, 2378, 2383 and 2388 in accordance with the received channel group identifier. If the MBAN user equipment 100 detects the beacon, which is transmitted from the MBAN coordinator 200*b* of the bandwidth of 2360 MHz to 2390 MHz, from the searched channels, the MBAN user equipment 100 may perform communication with the MBAN coordinator 200*b* by using the channels from which the beacon is detected (S140).

Two methods for transmitting the channel group identifier from the MBAN coordinator 200*a* to the MBAN user equipment 100 may be provided. The one method is that a channel group indication command is transmitted to a specific user equipment, and the other method is that the beacon, which includes the channel group indication field, is transmitted.

FIG. 11 is a diagram illustrating a structure of a channel group indication command frame according to the embodiment of the present invention.

As described with reference to FIG. 10, the channel group identifier may be included in a channel group indication field within a channel group indication command frame and then transmitted. The user equipment that has received the channel group indication command may identify the channel to be first searched at the bandwidth of 2360 MHz to 2390 MHz by parsing the channel group indication field.

FIG. 12 is a diagram illustrating a structure of a beacon frame according to the embodiment of the present invention.

As described with reference to FIG. 10, the channel group identifier may be included in a channel group indication field within a beacon frame and then transmitted. The beacon may receive all the MBAN user equipments, which perform communication with the MBAN coordinator, as described with reference to FIG. 3. The user equipment that has received the beacon may identify the channel to be first searched at the bandwidth of 2360 MHz to 2390 MHz by parsing the channel group indication field.

Figure 13:
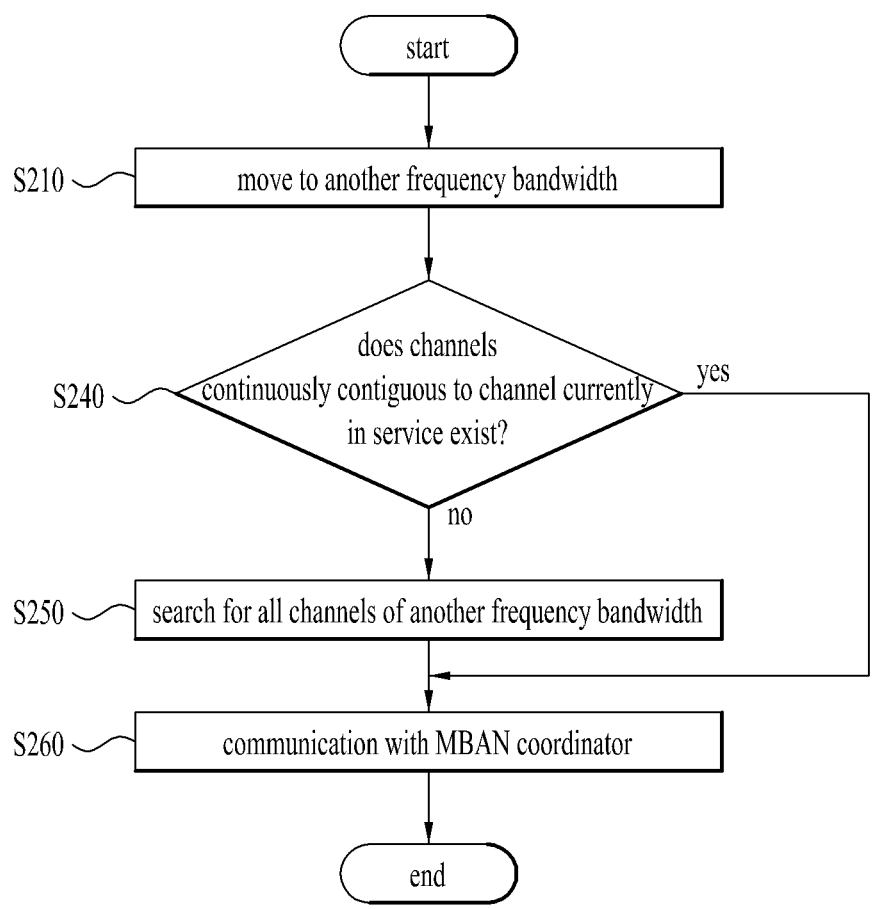
FIG. 13 is a flow chart illustrating a method for searching for a channel in accordance with the second embodiment of the present invention.

FIG. 13 is a flow chart illustrating a method for searching for a channel in accordance with the second embodiment of the present invention.

According to the second embodiment of the present invention, the MBAN user equipment searches for channels continuously contiguous to a channel used at a frequency bandwidth which is allocated, wherein the contiguous channels have another frequency bandwidth different from that of the above channel. In other words, even though the MBAN user equipment does not receive the channel group identifier from the MBAN coordinator, the MBAN user equipment first searches for the channels continuously contiguous to the channel of the frequency bandwidth currently in service when the MBAN user equipment desires to use the channel of another frequency bandwidth.

For example, the MBAN user equipment 100, which moves from the bandwidth of 2390 MHz to 2400 MHz to the bandwidth of 2360 MHz to 2390 MHz, first searches for the channels of the bandwidth of 2360 MHz to 2390 MHz continuously contiguous to the channel used at the bandwidth of 2390 MHz to 2400 MHz (S240). If the channel useful at the bandwidth of 2360 MHz to 2390 MHz is searched, the MBAN user equipment 100 performs communication with the coordinator by using the useful channel (S260).

If the MBAN user equipment 100 fails to search for the contiguous channels, the MBAN user equipment 100 searches for all the channels of the bandwidth of 2360 MHz to 2390 MHz in due order (S250).

If the MBAN user equipment uses the channel 2393 at the bandwidth of 2390 MHz to 2400 MHz shown in FIG. 9, the MBAN user equipment may first search for the channels 2363, 2368, 2373, 2378, 2383 and 2388 continuously contiguous to the channel 2393 when searching for the channels of the bandwidth of 2360 MHz to 2390 MHz.

Figure 14:
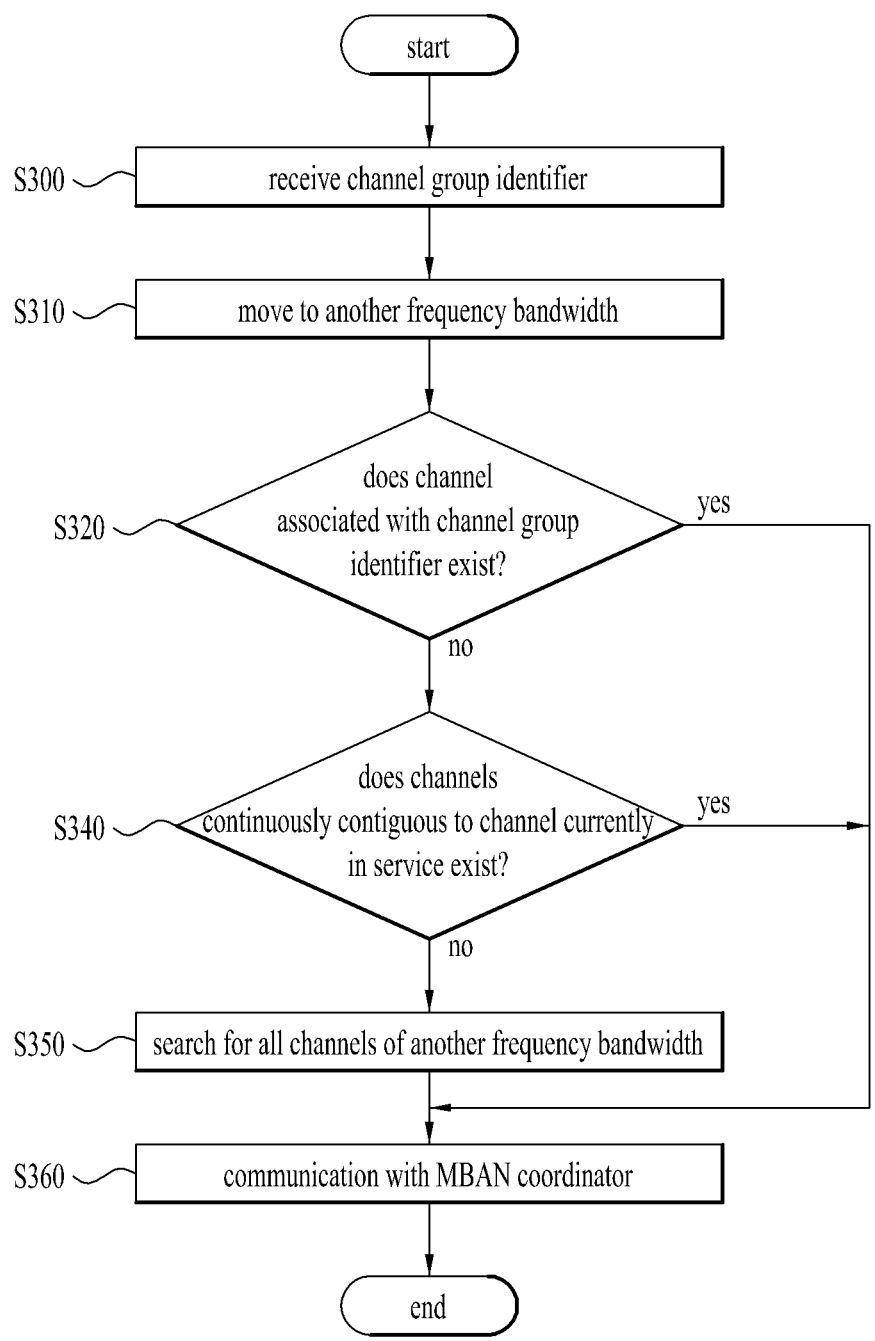
FIG. 14 is a flow chart illustrating a method for searching for a channel in accordance with the third embodiment of the present invention.

FIG. 14 is a flow chart illustrating a method for searching for a channel in accordance with the third embodiment of the present invention.

In the third embodiment of the present invention, the method for searching for a channel in FIG. 10 and the method for searching for a channel in FIG. 11 are used together. In other words, the user equipment that has received the channel group identifier from the MBAN coordinator first searches for the channel of the corresponding channel group (S320). If a channel available for the corresponding channel group does not exist, the MBAN user equipment searches for the channels of another frequency bandwidth, which are continuously contiguous to the channel currently in service (S340).

If the useful channel is searched at the step S320 or S340, the MBAN user equipment may perform communication with the MBAN coordinator by using the searched channel (S360).

If the useful channel is not searched at the step S320 or S340, the MBAN user equipment may search for all the channels at the bandwidth of 2360 MHz to 2390 MHz in due order (S350).

Figure 15:
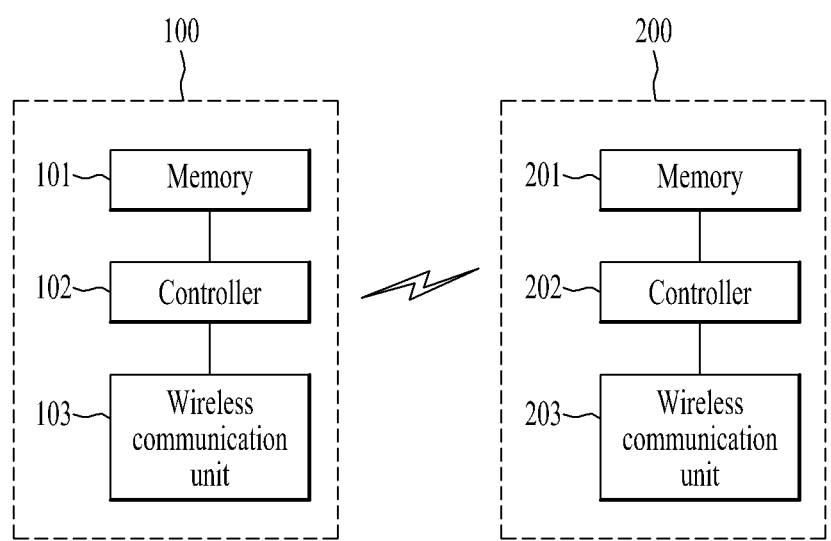
FIG. 15 is a block diagram illustrating a user equipment and a coordinator according to the embodiment of the present invention.

FIG. 15 is a block diagram illustrating a user equipment and a coordinator according to the embodiment of the present invention.

The MBAN user equipment 100 may include a memory 101, a controller 102 and a wireless communication unit 103.

The memory 101 may store the methods suggested in this specification. Also, the memory 101 may store the channel group identifier under the control of the controller 102. Also, the memory 101 may store a predetermined channel group and a channel included in the channel group.

The controller 102 controls the overall operation of the MBAN user equipment, the memory 101 and the wireless communication unit 103. Also, the controller 102 may receive an identifier of a specific channel group of a plurality of channel groups from the MBAN coordinator of a frequency bandwidth which is allocated. At this time, the identifier of the channel group is the identifier indicating the channel group that includes channels to be first searched at another frequency bandwidth. The method for grouping the channels in the MBAN system has been described with reference to FIG. 10.

The controller 102 may receive the identifier of the channel group through a channel group indication command, or may receive the identifier of the channel group through a channel group indication field included in a beacon transmitted from the MBAN coordinator of the allocated frequency bandwidth.

The wireless communication unit 103 may search for the channel of the MBAN system under the control of the controller 102. At this time, the wireless communication unit 103 may search for the channel included in the channel group associated with the received identifier of the channel group. Alternatively, the wireless communication unit 103 may first search for the channel of another bandwidth, which is arranged to be contiguous to the channel used at the allocated frequency bandwidth.

The MBAN coordinator 200 may include a memory 201, a controller 202 and a wireless communication unit 203.

The memory 201 may store the methods suggested in this specification. Also, the memory 201 may store information on the channel group under the control of the controller 202. In other words, the memory 201 may store a predetermined channel group, a channel included in the channel group and an identifier of the channel group.

The controller 202 controls the overall operation of the MBAN coordinator 200, the memory 201 and the wireless communication unit 203. Also, the controller 202 may generate and transmit an identifier of a specific channel group of a plurality of channel groups. At this time, the identifier of the channel group is the identifier indicating the channel group that includes channels to be first searched by the MBAN user equipment at another frequency bandwidth.

Each channel group of the plurality of channel groups is a set of channels which are continuously contiguous, and a central frequency of each channel belonging to one channel group may be different from central frequencies of all the channels belonging to another channel group. Also, each channel group may be located within another frequency bandwidth.

Also, each channel group of the plurality of channel groups is a set of contiguous channels which are arranged with a predetermined guard band interposed therebetween, and a central frequency of each channel belonging to one channel group may be different from central frequencies of all the channels belonging to another channel group. The method for grouping the channels in the MBAN system has been described with reference to FIG. 10.

The controller 202 may transmit the identifier of the channel group through a channel group indication command, or may transmit the identifier of the channel group through a channel group indication field included in a beacon.

The wireless communication unit 203 may perform communication with the MBAN user equipment through a designated channel under the control of the controller 202. Also, the wireless communication unit 203 may transmit beacon and command frames to a physical channel under the control of the controller 202.

The aforementioned embodiments may be implemented within a recording medium that may be read by a computer or a device similar to the computer by using software, hardware, or their combination.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method for channel searching for enabling a medical body area network (MBAN) user equipment, which operates at an allocated frequency bandwidth, to use another frequency bandwidth, the method comprising:
operating in a first frequency bandwidth moved from a second frequency bandwidth;

receiving an identifier of a specific channel group, among a plurality of channel groups of the first frequency bandwidth, from an MBAN coordinator; and searching for channels in the specific channel group before searching for other channels not included in the specific channel group at the first frequency bandwidth, based on the identifier, wherein, if an available channel for the MBAN user equipment does not exist in the specific channel group, the MBAN user equipment searches for channels of the first frequency bandwidth, which are continuously contiguous to a channel currently in service.

2. The method according to claim 1, wherein the receiving the identifier of the channel group includes receiving the identifier of the channel group through a channel group indication command.

3. The method according to claim 1, wherein the receiving the identifier of the channel group includes receiving the identifier of the channel group through a channel group indication field included in a beacon transmitted from the MBAN coordinator of the allocated frequency bandwidth.

4. The method according to claim 1, wherein:
each channel group of the plurality of channel groups is a set of channels, which are continuously contiguous; and
a central frequency of each channel belonging to one channel group is different from central frequencies of all the channels belonging to another channel group.

5. The method according to claim 1, wherein:
each channel group of the plurality of channel groups is a set of channels, which are continuously contiguous; and
at least one channel belonging to one channel group is overlapped with at least one channel belonging to another channel group within a predetermined frequency range, central frequencies of the respective channels being different from each other.

6. The method according to claim 4, wherein each channel group is located within another frequency bandwidth.

7. The method according to claim 1, wherein:
each channel group of the plurality of channel groups is a set of contiguous channels, which are arranged with a predetermined guard band interposed therebetween; and
a central frequency of each channel belonging to one channel group is different from central frequencies of all the channels belonging to another channel group.

8. The method according to claim 1, wherein:
each channel group of the plurality of channel groups includes two or more sets of channels, which are continuously contiguous or two or more sets of contiguous channels, which are arranged with a predetermined guard band interposed therebetween; and
a central frequency of each channel belonging to one channel group is different from central frequencies of all the channels belonging to another channel group.

9. The method according to claim 1, wherein each channel group of the plurality of channel groups is a set of random channels, which are selected by the MBAN coordinator from the channels located within another frequency bandwidth.

10. A medical body area network (MBAN) user equipment comprising:
a wireless communication unit configured to search for a channel; and
a controller configured to:
control the wireless communication unit;
operate in a first frequency bandwidth moved from a second frequency bandwidth;

control the wireless communication unit to receive an identifier of a specific channel group, among a plurality of channel groups of the first frequency bandwidth, from an MBAN coordinator control the wireless communication unit to search for channels in the specific channel group before searching for other channels not included in the specific channel group at the first frequency bandwidth, based on the identifier, wherein, if available channel for the MBAN user equipment does not exist in the specific channel group, the MBAN user equipment searches for channels of the first frequency bandwidth, which are continuously contiguous to a channel currently in service.

11. The MBAN user equipment according to claim 10, wherein the controller is further configured to control the wireless communication unit to receive the identifier of the channel group through a channel group indication command.

12. The MBAN user equipment according to claim 10, wherein the controller is further configured to control the wireless communication unit to receive the identifier of the channel group through a channel group indication field included in a beacon transmitted from the MBAN coordinator of the allocated frequency bandwidth.

13. The MBAN coordinator according to claim 10, wherein the controller is further configured to control the wireless communication unit to transmit the identifier of the channel group through a channel group indication command.

14. A medical body area network (MBAN) coordinator, comprising:
a wireless communication unit configured to transmit an identifier; and
a controller configured to:
control the wireless communication unit;
operate in a first frequency bandwidth moved from a second frequency bandwidth,
generate the identifier of a specific channel group, among a plurality of channel groups of the first frequency bandwidth; and
control the wireless communication unit to transmit the identifier to the MBAN user equipment,
wherein the MBAN user equipment search for channels in the specific channel group before searching for other channels not included in the specific channel group at the first frequency bandwidth, based on the identifier,
wherein, if available channel for the MBAN user equipment does not exist in the specific channel group, the MBAN user equipment searches for channels of the first frequency bandwidth, which are continuously contiguous to a channel currently in service.

15. The MBAN coordinator according to claim 14, wherein the controller is further configured to control the wireless communication unit to transmit the identifier of the channel group through a channel group indication field included in a beacon.

16. The MBAN coordinator according to claim 14, wherein:
each channel group of the plurality of channel groups is a set of channels, which are continuously contiguous; and
a central frequency of each channel belonging to one channel group is different from central frequencies of all the channels belonging to another channel group.

17. The MBAN coordinator according to claim 16, wherein each channel group is located within another frequency bandwidth.

18. The MBAN coordinator according to claim 14, wherein:
- each channel group of the plurality of channel groups is a set of channels, which are continuously contiguous; and
- at least one channel belonging to one channel group is overlapped with at least one channel belonging to another channel group within a predetermined frequency range, central frequencies of the respective channels being different from each other.

19. The MBAN coordinator according to claim 18, wherein each channel group is located within another frequency bandwidth.

20. The MBAN coordinator according to claim 14, wherein:
- each channel group of the plurality of channel groups is a set of contiguous channels, which are arranged with a predetermined guard band interposed therebetween; and
- a central frequency of each channel belonging to one channel group is different from central frequencies of all the channels belonging to another channel group.

21. The MBAN coordinator according to claim 14, wherein:
- each channel group of the plurality of channel groups includes two or more sets of channels, which are continuously contiguous or two or more sets of contiguous channels, which are arranged with a predetermined guard band interposed therebetween; and
- a central frequency of each channel belonging to one channel group is different from central frequencies of all the channels belonging to another channel group.

22. The MBAN coordinator according to claim 14, wherein the controller is further configured to control the wireless communication unit to:
- determine each channel group of the plurality of channel groups as a set of random channels, which are located within another frequency bandwidth; and
- previously transmit information on the random channels to the user equipment.

23. A method for a medical body area network (MBAN) coordinator, the method comprising:
- operating in a first frequency bandwidth moved from a second frequency bandwidth;
- generating the identifier of a specific channel group among a plurality of channel groups of the first frequency bandwidth; and
- transmitting the identifier to the MBAN user equipment,
- wherein the MBAN user equipment searches for channels in the specific channel group before searching for other channels not included in the specific channel group at the first frequency bandwidth, based on the identifier,
- wherein, if an available channel for the MBAN user equipment does not exist in the specific channel group, the MBAN user equipment searches for the channels of the first frequency bandwidth, which are continuously contiguous to a channel currently in service.

* * * * *